(12) United States Patent
Kim

(10) Patent No.: US 8,541,132 B2
(45) Date of Patent: *Sep. 24, 2013

(54) SECONDARY BATTERY

(75) Inventor: Daekyu Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 303 days.

This patent is subject to a terminal disclaimer.

(21) Appl. No.: 12/831,975

(22) Filed: Jul. 7, 2010

(65) Prior Publication Data

US 2011/0287302 A1  Nov. 24, 2011

(30) Foreign Application Priority Data

May 20, 2010  (KR) .................. 10-2010-0047292

(51) Int. Cl.
- H01M 2/08 (2006.01)
- H01M 2/18 (2006.01)
- H01M 2/02 (2006.01)
- H01M 6/16 (2006.01)

(52) U.S. Cl.
USPC ........... 429/174; 429/133; 429/164; 429/185; 429/324

(58) Field of Classification Search
USPC ................ 429/163, 164, 174, 185, 324, 162, 429/133, 136
See application file for complete search history.

(56) References Cited

U.S. PATENT DOCUMENTS

| | | | |
|---|---|---|---|
| 4,957,833 A * | 9/1990 | Daifuku et al. | 429/332 |
| 5,079,108 A * | 1/1992 | Annen et al. | 429/171 |
| 6,265,103 B1 * | 7/2001 | Shacklett et al. | 429/177 |
| 6,743,546 B1 | 6/2004 | Kaneda et al. | |
| 8,048,559 B2 * | 11/2011 | Kim | 429/174 |
| 8,062,787 B2 * | 11/2011 | Kim | 429/174 |
| 2003/0068562 A1 | 4/2003 | Kim et al. | |
| 2003/0148174 A1 | 8/2003 | Gu | |
| 2004/0265702 A1 | 12/2004 | Kim | |
| 2006/0154138 A1 | 7/2006 | Miyamoto et al. | |
| 2006/0172190 A1 | 8/2006 | Kaplin et al. | |
| 2006/0251962 A1 * | 11/2006 | Kim | 429/130 |
| 2007/0119047 A1 | 5/2007 | Gu | |

(Continued)

FOREIGN PATENT DOCUMENTS

| | | | |
|---|---|---|---|
| DE | 4327293 | * | 3/1994 |
| EP | 1 717 879 A1 | | 11/2006 |

(Continued)

OTHER PUBLICATIONS

Ophardt, Charles E., "Rubber Polymers", *Virtual Chembook*, Elmhurst College, 2003, pp. 1-2.

(Continued)

*Primary Examiner* — Ula C. Ruddock
*Assistant Examiner* — Thomas H. Parsons
(74) *Attorney, Agent, or Firm* — Knobbe, Martens, Olson & Bear LLP

(57) ABSTRACT

A secondary battery is disclosed. In one embodiment, the battery includes i) an electrode assembly, ii) an electrolyte, iii) a tape attached to at least part of an outer surface of the electrode assembly and iv) a case accommodating the electrode assembly, electrolyte and tape. The tape includes a base layer, and wherein at least a portion of the base layer is configured to exhibit an adhesive property when contacting the electrolyte so as to contact an inner surface of the case.

20 Claims, 10 Drawing Sheets

(56) References Cited

U.S. PATENT DOCUMENTS

| | | |
|---|---|---|
| 2007/0154787 A1 | 7/2007 | Jang et al. |
| 2008/0102354 A1 | 5/2008 | Lee |
| 2008/0152997 A1 | 6/2008 | Lee |
| 2008/0233474 A1 | 9/2008 | Son et al. |
| 2009/0297929 A1 | 12/2009 | Uchida |
| 2010/0080018 A1 | 4/2010 | Overes |

FOREIGN PATENT DOCUMENTS

| | | |
|---|---|---|
| EP | 1 804 320 A2 | 7/2007 |
| EP | 2 019 442 A1 | 1/2009 |
| GB | 1 385 910 | 3/1975 |
| JP | 06-150971 | 5/1994 |
| JP | 06-150971 A | 5/1994 |
| JP | 06150971 * | 5/1994 |
| JP | 06-181058 A | 6/1994 |
| JP | 10-302751 A | 11/1998 |
| JP | 11-176475 A | 7/1999 |
| JP | 2000-133220 A | 5/2000 |
| JP | 2001-273933 | 10/2001 |
| JP | 2001-273933 A | 10/2001 |
| JP | 2002-362622 A | 12/2002 |
| JP | 2003-151634 A | 5/2003 |
| JP | 2004-228078 A | 8/2004 |
| JP | 2004-315658 A | 11/2004 |
| JP | 2005-126452 A | 5/2005 |
| JP | 2007-184238 A | 7/2007 |
| JP | 2008-019311 A | 1/2008 |
| JP | 2010-511987 A | 4/2010 |
| KR | 10-2003-0066959 A | 8/2003 |
| KR | 10-2007-0025722 A | 3/2007 |
| KR | 10-0719725 B1 | 5/2007 |
| KR | 10-2007-0096649 A | 10/2007 |
| KR | 10-2008-0057977 A | 6/2008 |
| KR | 10-2009-0007074 A | 1/2009 |

OTHER PUBLICATIONS

European Search Report dated Aug. 18, 2010 for EP Application No. 0 925 2269.7, corresponding to U.S. Appl. No. 12/554,528, filed Sep. 4, 2009.

European Search Report dated Dec. 13, 2011 for European Patent Application No. EP 11 250 367.7 corresponding to U.S. Appl. No. 13/033,970, filed Feb. 24, 2011.

Office Action dated Feb. 15, 2011 for U.S. Appl. No. 12/554,504, filed Sep. 4, 2009, now U.S. Patent No. 8,048,559, issued Nov. 1, 2011.

Office Action dated Mar. 24, 2011 for U.S. Appl. No. 12/626,157, filed Nov. 25, 2009, now U.S. Patent No. 8,062,787, issued Nov. 22, 2011.

Office Action dated Feb. 7, 2012 for U.S. Appl. No. 12/554,528, filed Sep. 4, 2009.

Notice of Allowance dated Jul. 5, 2011 for U.S. Appl. No. 12/554,504, filed Sep. 4, 2009, now U.S. Patent No. 8,048,559, Issued Nov. 1, 2011.

Notice of Allowance dated Sep. 8, 2011 for U.S. Appl. No. 12/626,157, filed Nov. 25, 2009, now U.S. Patent No. 8,062,787, issued Nov. 22, 2011.

Korean Office Action dated May 9, 2011 for Korean Patent Application No. KR 10-2010-0011078 which corresponds to U.S. Appl. No. 12/554,504, filed Sep. 4, 2009, now U.S. Patent No. 8,048,559, issued Nov. 1, 2011.

Korean Office Action dated Oct. 13, 2011 for Korean Patent Application No. KR 10-2009-0119812 which corresponds to U.S. Appl. No. 12/554,528, filed Sep. 4, 2009.

Korean Notice of Allowance dated Jan. 19, 2012 for Korean Patent Application No. KR 10-2010-0011079 corresponding to U.S. Appl. No. 12/626,157, filed Nov. 25, 2009, now U.S. Patent No. 8,062,787, Issued Nov. 22, 2011.

Korean Office Action dated Aug. 25, 2011 for Korean Patent Application No. KR 10-2010-0047292 which corresponds to captioned U.S. Appl. No. 12/831,975.

European Search Report dated Sep. 10, 2010 for EP Application No. 10251224.1.

Japanese Office Action dated Aug. 14, 2012 for Japanese Patent Application No. JP 2010-155667 which shares priority of Korean Patent Application No. KR 10-2010-0047292.

Notice of Allowance dated Jun. 7, 2012 for U.S. Appl. No. 12/554,528, filed Sep. 4, 2009.

Japanese Office Action dated Nov. 13, 2012 for Japanese Patent Application No. JP 2010-196562 which shares priority of U.S. Appl. No. 61/241,768, filed Sep. 11, 2009, with U.S. Appl. No. 13/244,172, filed Sep. 23, 2011.

* cited by examiner

SECONDARY BATTERY

CROSS-REFERENCE TO RELATED APPLICATIONS

This application claims the benefit of Korean Patent Application No. 10-2010-0047292 filed on May 20, 2010, the contents of which are incorporated herein by reference in their entirety.

This application also relates to U.S. patent application Ser. Nos. 12/554,528 and 12/554,504 both filed on Sep. 4, 2009, and 12/626,157 filed on Nov. 25, 2010, all of which are incorporated herein by reference in their entirety.

BACKGROUND

1. Field

The described technology generally relates to a secondary battery.

2. Description of the Related Technology

In general, a secondary battery is formed by placing an electrode assembly including i) a positive electrode plate, ii) a negative electrode plate, and iii) a separator interposed therebetween together with an electrolyte into a case. The secondary battery may be classified as a cylindrical type, a prismatic type, a pouch type, etc., according to the shape of the case.

SUMMARY OF CERTAIN INVENTIVE ASPECTS

One aspect is a secondary battery which can prevent an electrode assembly from moving inside a case.

Another aspect is a secondary battery including an electrode assembly, an electrolyte, a tape attached to at least part of an outer surface of the electrode assembly, and a case accommodating the electrode assembly, wherein the tape includes a base layer having at least a portion exhibiting an adhesive property when contacting the electrolyte, and the at least the portion exhibiting the adhesive property contacts an inner surface of the case.

The tape may include an adhesive layer formed on a rear surface of the base layer and contacting the outer surface of the electrode assembly.

When the base layer contacts the electrolyte, at least a portion of the base layer may shrink and exhibit an adhesive property.

The base layer may be an oriented polystyrene (OPS) film.

The electrode assembly may be formed by sequentially stacking and winding a first electrode, a separator, a second electrode, the separator disposed between the first and second electrodes, and the electrode assembly including an outermost finishing part at which a winding end of the separator is placed.

The tape may be attached to the electrode assembly in such a manner that it includes the outermost finishing part of the electrode assembly.

The tape may be attached to the outermost finishing part of the electrode assembly.

The electrolyte may include a carbonate based solvent, in which the carbonate based solvent of the electrolyte includes at least one of the following: dimethyl carbonate (DMC) electrolyte, diethyl carbonate (DEC) and dipropyl carbonate (DPC). The electrolyte may include about 10% to about 60% by weight of a carbonate based solvent.

The base layer may have a thickness in the range of about 10 μm and about 50 μm.

The tape may be attached to the entire outer circumference of the electrode assembly.

Assuming that a length of the entire outer circumference of the electrode assembly is 1, the tape may be attached to the outer circumference of the electrode assembly by 0.5 or more.

Assuming that the entire outer circumference of the electrode assembly is 1, the tape may be attached to the outer circumference of the electrode assembly by more than 0.5 and less than 1.

The tape may be attached to parts other than an upper end part and a lower end part of the outer surface of the electrode assembly.

A width of the tape may be at least about 20% of a width of the electrode assembly.

The tape may further include an auxiliary base layer and an auxiliary adhesive layer sequentially formed on the adhesive layer.

The tape may have an adhesion force of at least about 1 kgf/cm².

The case may be of a cylindrical type, a prismatic type, or a pouch type.

Another aspect is a secondary battery including an electrode assembly, an electrolyte, a tape attached to at least part of an outer surface of the electrode assembly, and a case accommodating the electrode assembly, wherein the tape includes an adhesive layer contacting the outer surface of the electrode assembly, and a base layer having at least a portion exhibiting an adhesive property when contacting the electrolyte, and the base layer exhibiting the adhesive property has an uneven surface.

The base layer exhibiting the adhesive property may include a first region and a second region, the first region being thicker than the second region, and the first region contacting an inner surface of the case.

Another aspect is a secondary battery comprising: an electrode assembly; an electrolyte; a tape attached to at least part of an outer surface of the electrode assembly; and a case accommodating the electrode assembly, electrolyte and tape, wherein the tape comprises a base layer, and wherein at least a portion of the base layer is configured to exhibit an adhesive property when contacting the electrolyte so as to contact an inner surface of the case.

In the above battery, the tape further comprises an adhesive layer formed on a rear surface of the base layer and contacting the outer surface of the electrode assembly. In the above battery, at least a portion of the base layer is configured to shrink and exhibit an adhesive property when the base layer contacts the electrolyte. In the above battery, the base layer is formed at least partially of an oriented polystyrene (OPS) film.

In the above battery, the electrode assembly comprises a first electrode, a separator and a second electrode which are sequentially stacked and wound, wherein the separator is disposed between the first and second electrodes, and wherein an outermost finishing part is formed on a winding end of the separator. In the above battery, the tape comprises the outermost finishing part. In the above battery, the electrode assembly comprises the outermost finishing part, and wherein the tape is attached to the outermost finishing part of the electrode assembly.

In the above battery, the electrolyte comprises a carbonate based solvent, and wherein the carbonate based solvent of the electrolyte comprises at least one of the following: dimethyl carbonate (DMC) electrolyte, diethyl carbonate (DEC) and dipropyl carbonate (DPC). In the above battery, the electrolyte comprises about 10% to about 60% by weight of the carbonate based solvent. In the above battery, the base layer has a thickness in the range of about 10 μm and about 50 μm. In the above battery, the tape is attached to substantially the entire outer circumference of the electrode assembly.

In the above battery, when the dimension of the entire outer circumference of the electrode assembly is defined as 1, the dimension of the tape attached to the outer circumference of the electrode assembly is defined as 0.5 or more. In the above battery, when the dimension of the entire outer circumference of the electrode assembly is defined as 1, the dimension of the tape attached to the outer circumference of the electrode assembly is defined as more than 0.5 and less than 1.

In the above battery, the tape is attached to parts other than an upper end part and a lower end part of the outer surface of the electrode assembly. In the above battery, a width of the tape is at least about 20% of a width of the electrode assembly. In the above battery, the tape further comprises an auxiliary base layer and an auxiliary adhesive layer interposed between the base layer and adhesive layer, wherein the auxiliary base layer contacts the adhesive layer and auxiliary adhesive layer, and wherein the auxiliary adhesive layer contacts the base layer and auxiliary base layer. In the above battery, the tape has an adhesion force of at least about 1 kgf/cm$^2$. In the above battery, the case is of a cylindrical type, a prismatic type, or a pouch type.

Another aspect is a secondary battery comprising: an electrode assembly; an electrolyte; a tape attached to at least part of an outer surface of the electrode assembly; and a case accommodating the electrode assembly, electrolyte and tape, wherein the tape comprises i) an adhesive layer contacting the outer surface of the electrode assembly and ii) a base layer having at least a portion exhibiting an adhesive property when contacting the electrolyte, and wherein the base layer has an uneven surface.

In the above battery, the base layer comprises a first region and a second region, wherein the first region is thicker than the second region, and wherein the first region contacts an inner surface of the case.

Another aspect is a secondary battery comprising: an electrode assembly; an electrolyte; a case accommodating the electrode assembly, an adhesive layer attached to at least part of an outer surface of the electrode assembly; and a base layer having first and second surfaces opposing each other, wherein the first surface contacts the adhesive layer, and wherein at least a portion of the second surface of the base layer adhesively contacts an inner surface of the case.

DETAILED DESCRIPTION OF CERTAIN INVENTIVE EMBODIMENTS

Figure 1:
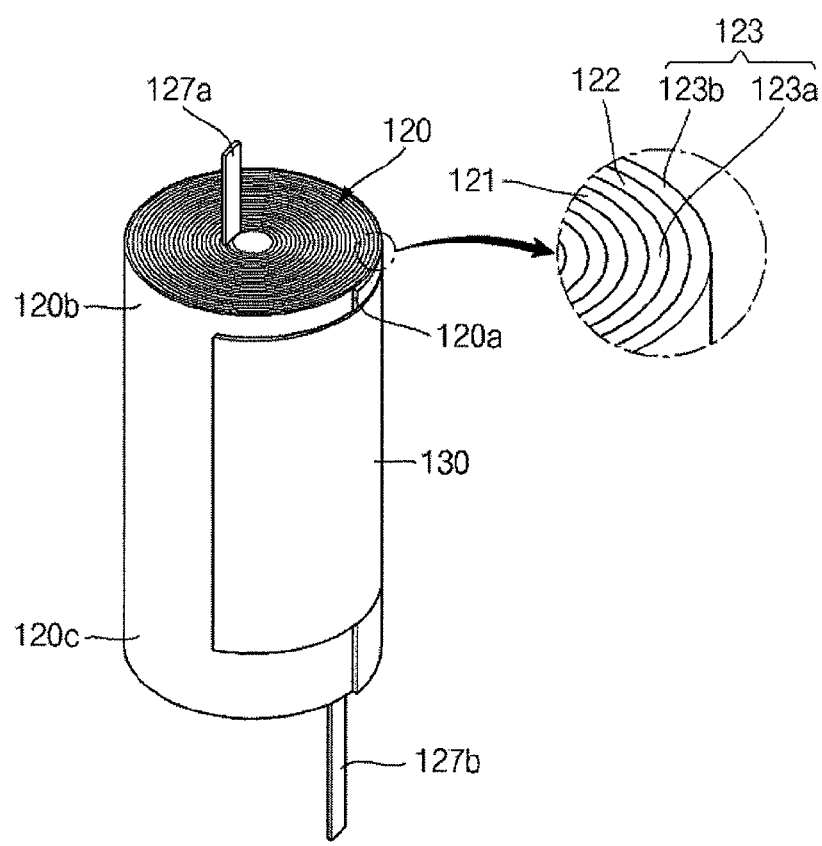
FIG. 1 is a perspective view of an electrode assembly having a tape according to an embodiment.
Figure 2:
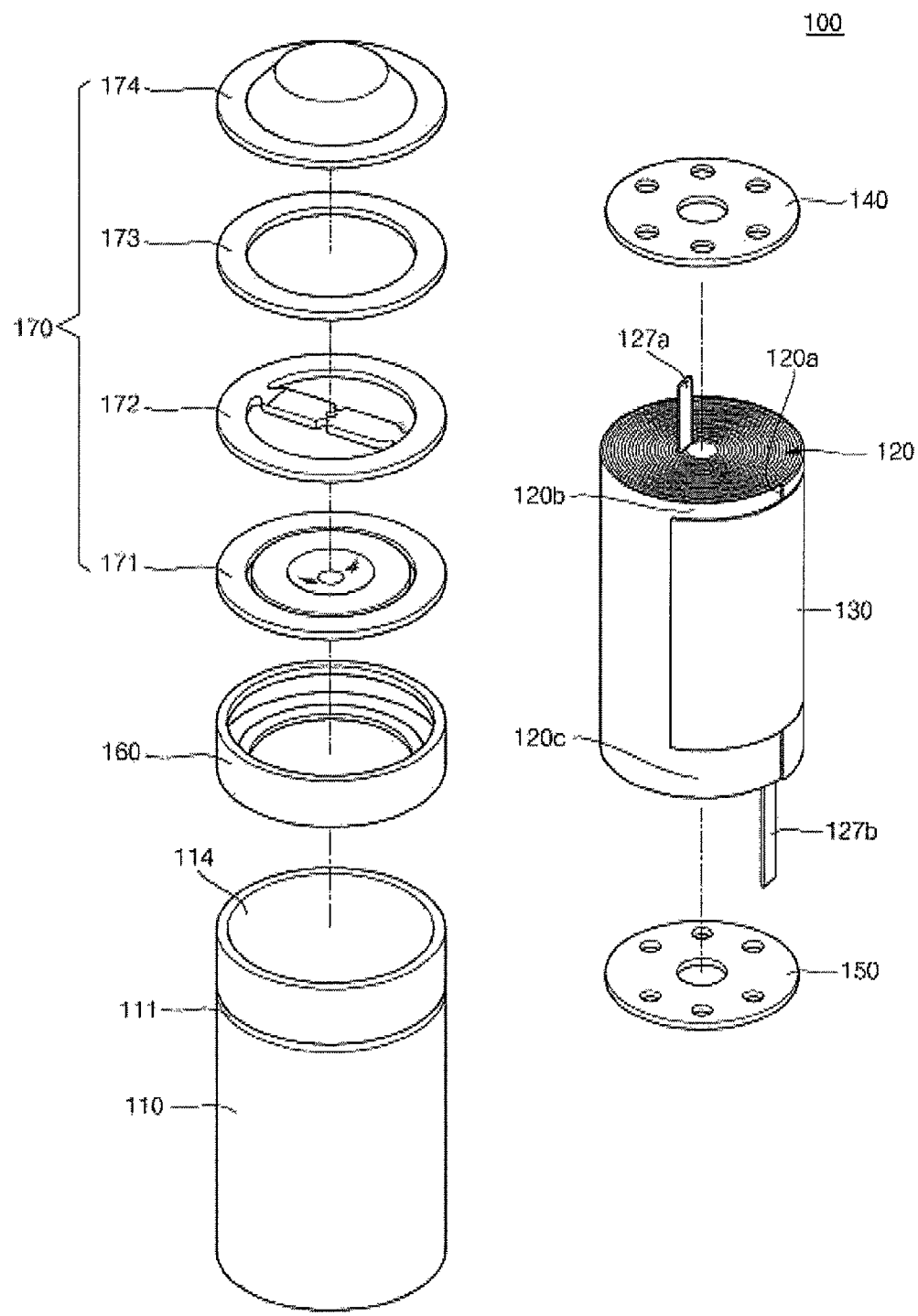
FIG. 2 is an exploded perspective view of a cylindrical secondary battery including the electrode assembly having a tape shown in FIG. 1.
Figure 3:
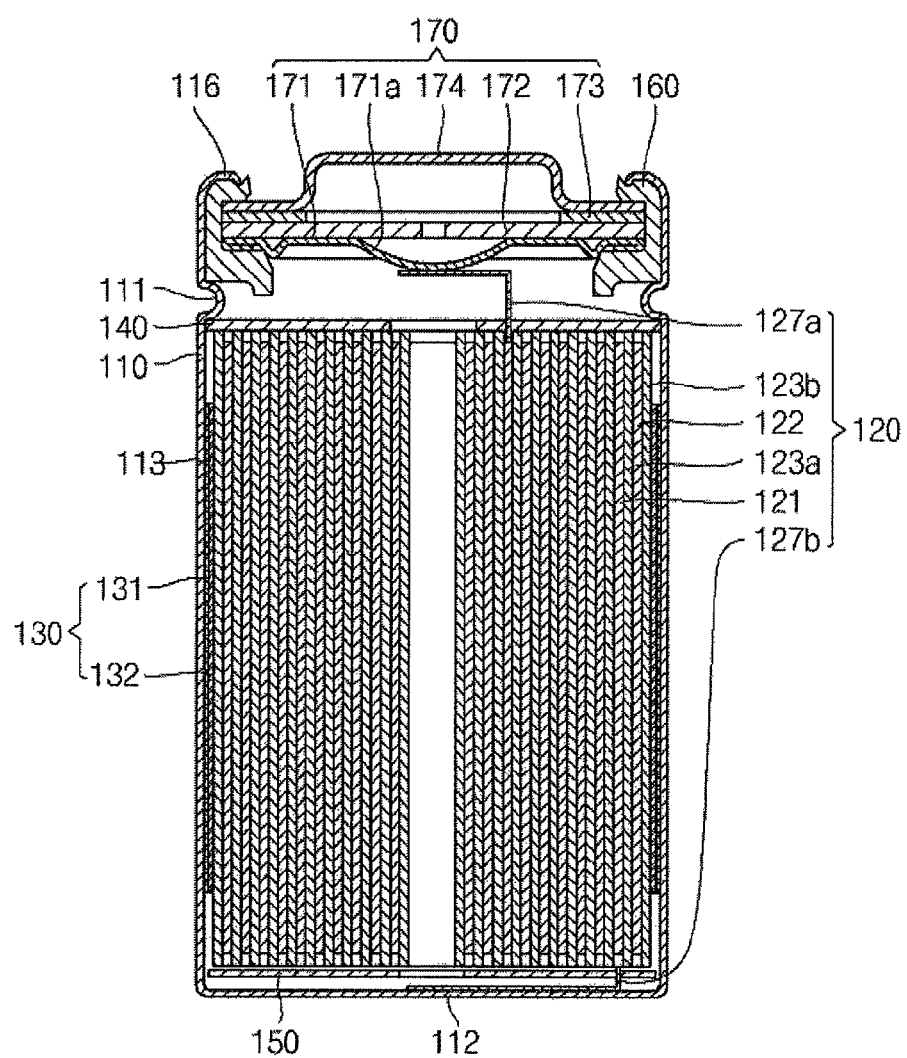
FIG. 3 illustrates a connected longitudinal sectional view of the cylindrical secondary battery shown in FIG. 2.
Figure 4:
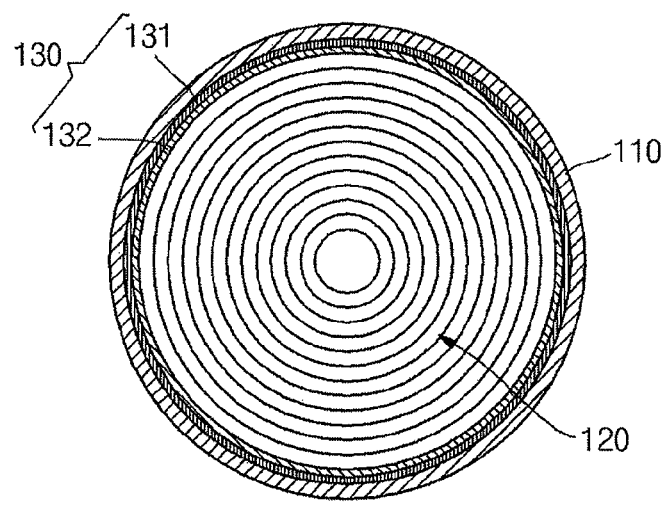
FIG. 4 illustrates a connected horizontal sectional view of the cylindrical secondary battery shown in FIG. 2.
Figure 5:
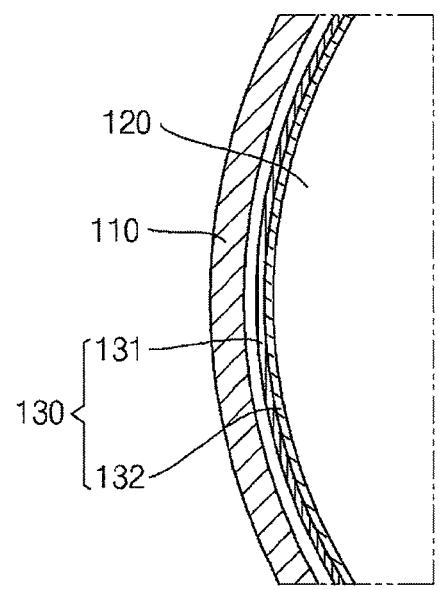
FIG. 5 schematically illustrates a connected longitudinal sectional view of the cylindrical secondary battery shown in FIG. 2 before injecting an electrolyte into the cylindrical secondary battery.

An electrode assembly of a secondary battery is accommodated in a case, and may often easily rotate and move inside the case due to external vibration or impact. The movement of the electrode assembly may increase internal resistance of a battery and may cause damages to electrode tabs of the electrode assembly.

Embodiments will now be described in detail with reference to exemplary embodiments thereof.

Referring to FIGS. 1 through 6, a cylindrical secondary battery 100 includes a case 110, an electrode assembly 120, a tape 130, an upper insulation member 140, a lower insulation member 150, a gasket 160, and a cap assembly 170.

The case 110 may be cylindrical or prismatic or a pouch type according to the external shape of the battery. In the present embodiment, the secondary battery is described with reference to a cylindrical secondary battery. In other embodiments, a prismatic secondary battery and a pouch-type secondary battery will be described.

The case 110 has a cylinder shape and may be made of a lightweight conductive metal such as aluminum or aluminum alloy. The case 110 may be fabricated by a machining process such as deep drawing. The case 110 may have various shapes according to the shape of the electrode assembly 120.

The case 110 includes a disk-shaped bottom plate 112, and a cylindrical sidewall 113 extending from the edge of the bottom plate 112. A beading part 111 protruding inwardly along the periphery of the case 110 is formed on an upper portion of the sidewall 113. The beading part 111 prevents the upper insulation member 140, the electrode assembly 120 and the lower insulation member 150 from moving from the inside of the case 110 toward a direction substantially perpendicular to the bottom plate 112. A crimping part 116 is formed at an upper end of the sidewall 113. The crimping part 116 provides sealing between the case 110 and the cap assembly 170. An opening 114 is defined in a top portion of the sidewall 113 to allow the lower insulation member 150, the electrode assembly 120, the upper insulation member 140, the gasket 160 and the cap assembly 170 to be sequentially inserted into the case 110.

The electrode assembly 120 includes a first electrode plate 121, a second electrode plate 122, and a separator 123. The separator 123 may include a first separator 123a and a second separator 123b. In one embodiment, the electrode assembly 120 may be formed by sequentially stacking the first electrode plate 121, the first separator 123a, the second electrode plate 122 and the second separator 123b and then cylindrically winding the stacked structure.

The electrode assembly 120 may further include a first electrode tab 127a and a second electrode tab 127b. In order to prevent a short circuit between the first electrode plate 121 and the second electrode plate 122, an insulation tape (not shown) may be formed at an interface between the first electrode tab 127a and the second electrode tab 127b drawn from the electrode assembly 120.

Any one of the first electrode plate 121 and the second electrode plate 122, for example, the first electrode plate 121, may be used as a positive electrode plate, and the other, for example, the second electrode plate 122, may be used as a negative electrode plate. However, the second electrode plate 122 may be a positive electrode plate, and the first electrode plate 121 may be a negative electrode plate. In the following description, it is assumed that the first electrode plate 121 is a positive electrode plate and the second electrode plate 122 is a negative electrode plate.

In one embodiment, although not illustrated in detail, the first electrode plate 121, used as a positive electrode plate, includes a positive electrode collector, and a positive electrode coating portion coated on at least one surface of the positive electrode collector.

The positive electrode collector may be formed at least partially of a highly conductive metal foil, for example, aluminum (Al) foil, but other materials may also be used for the positive electrode collector.

In one embodiment, the positive electrode coating portion is prepared by coating a mixture of a positive electrode active material, a conductive member, and a binder on at least one surface of the positive electrode collector. Composite metal oxides, such as $LiCoO_2$, $LiMn_2O_4$, $LiNiO_2$, $LiNi_{1-x}CO_xO_2$ ($0<x<1$), or $LiMnO_2$, may be used as the positive electrode active material, but other materials may also be used for the positive electrode active material.

A first uncoated portion may be formed on at least one of two ends of the first electrode plate 121 formed in a winding direction. The positive electrode coating material is not coated on the first uncoated portion. In one embodiment, the first electrode tab 127a as a positive electrode tab is coupled to the first uncoated portion by, for example, welding. The first electrode tab 127a outwardly extends from the electrode assembly 120.

Although not illustrated in detail, the second electrode plate 122 used as a negative electrode plate includes a negative electrode collector, and a negative electrode coating portion coated on at least one surface of the negative electrode collector.

The negative electrode collector may be formed at least partially of a highly conductive metal foil, for example, copper (Cu) or nickel (Ni) foil, but other materials may also be used for the negative electrode collector.

In one embodiment, the negative electrode coating portion is prepared by coating a mixture of a negative electrode active material, a conductive member, and a binder on at least one surface of the negative electrode collector. Carbon-based materials, Si, Sn, tin oxides, composite tin alloys, transition metal oxides, lithium metal nitric oxides, or lithium metal oxides may be used as the negative electrode active material, but other materials may also be used for the negative electrode active material.

A second uncoated portion may be formed on at least one of two ends of the second electrode plate 122 formed in a winding direction. The negative electrode coating material is not coated on the second uncoated portion. In one embodiment, the second electrode tab 127b as a negative electrode tab is coupled to the second uncoated portion by, for example, welding. The second electrode tab 127b outwardly extends from the electrode assembly 120.

In one embodiment, the second electrode tab 127b is coupled to the bottom plate 112 of the case 110 by, for example, welding. In this embodiment, the case 110 has a negative polarity, and the bottom plate 112 of the case 110 is used as a negative terminal of the secondary battery 100.

The separator 123 allows the first electrode plate 121 and the second electrode plate 122 to be separated from each other. Micropores may be formed in the first and second separators 123a and 123b. As a result, lithium ions moving between the first and second electrode plates 121 and 122 may pass through the micropores. Each of the first and second separators 123a and 123b may be formed at least partially of a polymer resin such as polyethylene (PE) and polypropylene (PP), but other materials may also be used for the separator 123.

The tape 130 is attached to at least a portion of an outer surface of the electrode assembly 120. That is to say, the tape 130 is positioned between the electrode assembly 120 and the case 110. The tape 130 may be a movement preventing tape. The tape 130 includes a base layer 131 having at least a portion thereof exhibit an adhesive property when the base layer 131 contacts an electrolyte. When at least a portion of the base layer 131 exhibits an adhesive property due to a contact with the electrolyte, the adhesive portion of the base layer 131 comes into contact with an inner surface of the case 110, thereby preventing the electrode assembly 120 from moving inside the case 110.

In one embodiment, the tape 130 may further include an adhesive layer 132 formed on a rear surface of the base layer 131.

In one embodiment, the base layer 131 is formed of a polymer film which at least partially has an adhesive property such that at least a portion thereof is melted due to a contact with the electrolyte. In this embodiment, a carbonate-based solvent contained in the electrolyte is permeated between molecules of the polymer. In one embodiment, when a polymer film contacts an electrolyte, a carbonate-based solvent of the electrolyte is permeated between molecules of the polymer film, and thus, at least a portion of the polymer film is melted, so that the directionality of the polymer film, which is formed during the fabrication process of the polymer film, may be lost, and the polymer film is shrunk, imparting an adhesive property to the shrunk portion. Here, the term "directionality" refers to uniaxial extension, biaxial extension or compression, which is applied during a film manufacturing process using resin.

Figure 6:
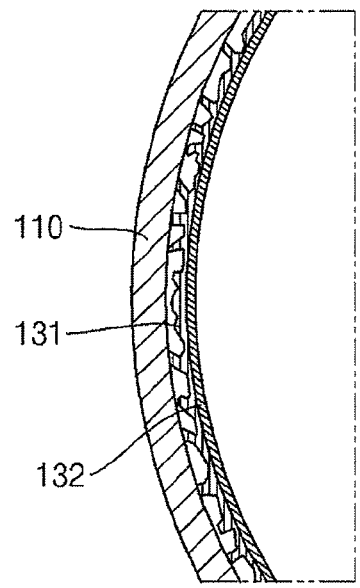
FIG. 6 schematically illustrates a connected longitudinal sectional view of the cylindrical secondary battery shown in FIG. 2 after injecting an electrolyte into the cylindrical secondary battery.

When at least a portion of the base layer 131 exhibits an adhesive property, the adhesive base layer 131 may have an uneven surface (See FIG. 6). In this embodiment, the adhesive portion of the base layer 131 is thicker than the other portions. The thicker portion of the base layer 131 contacts the inner surface of the case 110. Accordingly, the portions having gradually increasing thicknesses from the adhesive base layer 131 facilitate the electrode assembly 120 and the inner surface of the case 110 to be securely fixed to each other by an adhesive force. Therefore, it is possible to prevent the electrode assembly 120 from moving inside the case 110.

The base layer 131 exhibiting an adhesive property may include a first region and a second region. The first region is thicker than the second region, and the first region may be a region in contact with an inner surface of the case 110. Since the first region in contact with the inner surface of the case 110 exhibits an adhesive property, the electrode assembly 120 is securely fixed to the inner surface of the case 110 by a predetermined adhesive force. Therefore, in the cylindrical secondary battery 100, the electrode assembly 120 does not move inside the case 110.

The polymer film may include any film as long as may exhibit an adhesive property when contacting an electrolyte. Examples of the polymer film may include at least one of the following: a polystyrene (PS) film, a polyamide film, a polyacrylonitrile film, a polyvinyl alcohol film, a polycarbonate film, a polyethylene vinyl acetate film, and an oriented polystyrene (OPS) film, which may be easily penetrated by the carbonate-based solvent of the electrolyte because of its relatively large intermolecular distance.

Since the base layer 131 is modified in various manners according to the size of a battery, it may not be limited to a specific size. For example, the base layer 131 may have a thickness ranging from about 10 μm to about 50 μm, but is not limited thereto. The above range may provide an optimum balance between the moving preventing effect of the electrode assembly 120 and an amount of the electrolyte to be injected (or the capacity of the secondary battery 100). However, depending on the embodiment, the thickness of the base layer 131 may be less than about 10 μm or greater than about 50 μm.

The adhesive layer 132 is coated on a rear surface of the base layer 131 and is disposed to make contact with an outer surface of the wound electrode assembly 120.

The adhesive layer 132 may be formed of any adhesive material that is generally used in the related art. In one embodiment, the adhesive layer 132 may be formed by coating an acryl-based adhesive material on the base layer 131. Examples of the acryl-based adhesive material may include polymethyl methacrylate (PMMA), polyethyl methacrylate (PEMA), and polybutyl methacrylate (PBMA).

The adhesive layer 132 may be coated on the base layer 131 to different thicknesses by using various coating methods known in the related art. For example, the adhesive layer 132 may be formed by coating an adhesive material to a thickness of about 1 μm to about 30 μm by knife coating.

The tape 130 may be attached to the electrode assembly 120 in such a manner that the entire width of the electrode assembly 120, which is substantially perpendicular to the winding direction, is wound around by the tape 130. In one embodiment, the tape 130 may be attached to parts other than an upper end part 120b and a lower end part 120c of the outer surface of the electrode assembly 120. An electrolyte may be permeated between the case 110 and the electrode assembly 120 through the upper end part 120b, and the electrolyte injected to the bottom of the case 110 may make contact with the electrode assembly 120 at the lower end part 120c. Therefore, when impregnability of the electrode assembly 120 in the electrolyte is considered, the tape 130 may not be attached to the upper end part 120b and the lower end part 120c.

In one embodiment, the width of the tape 130 is not limited to a specific value. However, the width of the tape 130 may be greater than or equal to about 20% of the width of the electrode assembly 120. In this range, the moving preventing effect of the electrode assembly 120 may be sufficiently high.

The tape 130 may be attached to only a portion of the electrode assembly 120 in the circumferential direction of the electrode assembly 120.

In particular, assuming that a length of the entire outer circumference of the electrode assembly 120 is 1, the tape 130 may be attached to the outer circumference of the electrode assembly 120 by about 0.5 or more, that is, at least half of the entire outer circumference of the electrode assembly 120. In one embodiment, the tape 130 may be attached to the outer surface of the electrode assembly 120 by more than 0.5 and less than 1, that is, greater than half of and smaller than the entire outer circumference of the electrode assembly 120. As described above, a predetermined range of the outer surface of the electrode assembly 120 may be enclosed by the tape 130, thereby efficiently saving the tape 130 while increasing the movement preventing effect of the electrode assembly 120.

The electrode assembly 120 includes an outermost finishing part 120a in which a winding end of the separator 123 is placed. The tape 130 may be attached to the electrode assembly 120 in such a manner that it includes the outermost finishing part 120a of the electrode assembly 120. In this case, even if a separate sealing tape for sealing the outermost finishing part 120a of the electrode assembly 120 is not provided, since the tape 130 functions as a sealing tape as well, it may prevent unwinding of the electrode assembly 120. That is to say, the electrode assembly 120 includes on its outer surface the outermost finishing part 120a in which the outermost end of the second separator 123b is placed, and the tape 130, including the outermost finishing part 120a, is attached to enclose the outer circumference of the electrode assembly 120, thereby preventing unwinding of the electrode assembly 120.

As described above, the tape 130 exhibits an adhesive property when the base layer 131 contacts the electrolyte. In one embodiment, after contacting the electrolyte, the tape 130 may have an adhesion force of about 1 kgf/cm$^2$ or greater. In another embodiment, the tape 130 has an adhesion force ranging from about 1 kgf/cm$^2$ to about 5 kgf/cm$^2$. When an adhesion force of the tape 130 remains after contacting the electrolyte, it may effectively prevent the electrode assembly 120 from moving inside the case 110.

The upper insulating member 140 may have an approximate disk shape to provide insulation between the electrode assembly 120 and the beading part 111 of the case 110.

The lower insulating member 150 may have an approximate disk shape to provide insulation between the electrode assembly 120 and the bottom plate 112 of the case 110.

The cap assembly 170 is disposed between the crimping part 116 and the beading part 111. Any cap assembly that is generally used in the related art may be used as the cap assembly 170 without limitation. In an embodiment, the cap assembly 170 may include a safety vent 171, a current interrupt device (CID) 172, a positive temperature coefficient (PTC) device 173, and a cap-up 174 that are disposed in this order away from the electrode assembly 120.

The safety vent 171 electrically connects the first electrode tab 127a and the CID 172. The safety vent 171 includes a protrusion 171a at a central portion thereof. The protrusion 171a may be convex toward the electrode assembly 120 and electrically connected to the first electrode tab 127a. When the internal pressure of the secondary battery 100 exceeds a reference pressure, the protrusion 171a may be reversed.

The CID 172 electrically connects the safety vent 171 and the PTC device 173. When the protrusion 171a is reversed due to an increased internal pressure of the secondary battery 100, the CID 172 is fractured so that the safety vent 171 and the PTC device 173 may be electrically disconnected.

The electric resistance of the PTC device 173 may increase rapidly as the surrounding temperature increases. The PTC device 173 electrically connects the CID 172 and the cap-up 174. When the secondary battery 100 is overheated, the electric resistance of the PTC device 173 may increase rapidly to interrupt the current flow.

The cap-up 174 is electrically connected to the PTC device 173 and exposed to the outside of the secondary battery 100. The cap-up 174 may be used as a positive terminal of the secondary battery 100.

The cap assembly 170 is insulated from the case 110 by an insulating gasket 160. The insulating gasket 160 is disposed around the circumference of the cap assembly 100 and fixed to the inside of the case 110 by the beading part 111 and the crimping part 116.

The structure of the cap assembly 170 shown in the drawings is merely exemplary and is not considered limiting. The structure of the cap assembly 170 can be modified and changed in various manners The secondary battery 100 includes an electrolyte. The electrolyte may include a solvent based on carbonates. Examples of such carbonates include dimethyl carbonate (DMC), diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC). The carbonate based solvent may include at least one of dimethyl carbonate (DMC), diethyl carbonate (DEC), and dipropyl carbonate (DPC). Such a carbonate based solvent may easily permeate between molecules of a polymer such as polystyrene (PS) having a relatively large intermolecular distance. Therefore, when the carbonate based solvent makes a contact with the tape 130, it is easily permeated between molecules of the polymer in the base layer 131, thereby facilitating the base layer 131 in exhibiting an adhesive property.

The carbonate based solvent may include about 10% to about 60% by weight of the total content of the electrolyte. The above range may provide sufficient permeability of the carbonate based solvent and enhanced movement preventing effect. However, depending on the embodiment, the weight proportion of the carbonate based solvent may be less than about 10% or greater than about 60%.

The electrolyte may also include any component generally used in the related art. For example, the electrolyte may include any electrolyte as long as it may include a carbonate based solvent, particularly dimethyl carbonate (DMC), diethyl carbonate (DEC) or dipropyl carbonate (DPC).

Figure 7:
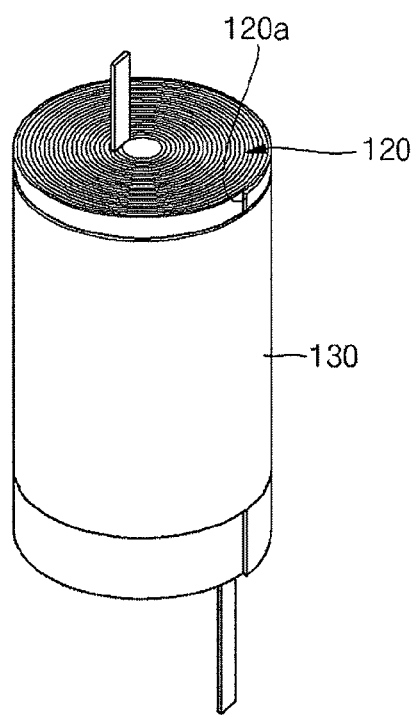
FIG. 7 is a perspective view of an electrode assembly having a tape according to another embodiment.

FIG. 7 is a perspective view of an electrode assembly having a tape according to another embodiment.

As shown in FIG. 7, the tape 130 may be attached to substantially the entire outer surface of the electrode assembly 120 in the circumferential direction of the electrode assembly 120.

As described above, the enhanced movement preventing effect of the electrode assembly 120 can be achieved by winding around substantially the entire outer circumference of the electrode assembly 120. In addition, as described above, the electrode assembly 120 includes the outermost finishing part 120a in which a winding end of the separator 123 is placed. Since the tape 130 is attached to substantially the entire outer surface of the electrode assembly 120 in the circumference direction of the electrode assembly 120, it includes the outermost finishing part 120a of the electrode assembly 120. In this case, even if a separate sealing tape for sealing the outermost finishing part 120a of the electrode assembly 120 is not provided, since the tape 130 functions as a sealing tape as well, unwinding of the electrode assembly 120 can be prevented.

As described above, structures of the electrode assembly 120 and the tape 130 are substantially the same as those of the embodiment illustrated in FIGS. 1 through 6, except that the tape 130 is attached to the entire outer circumference of the electrode assembly 120, and thus a detailed description thereof will not be given.

Figure 8:
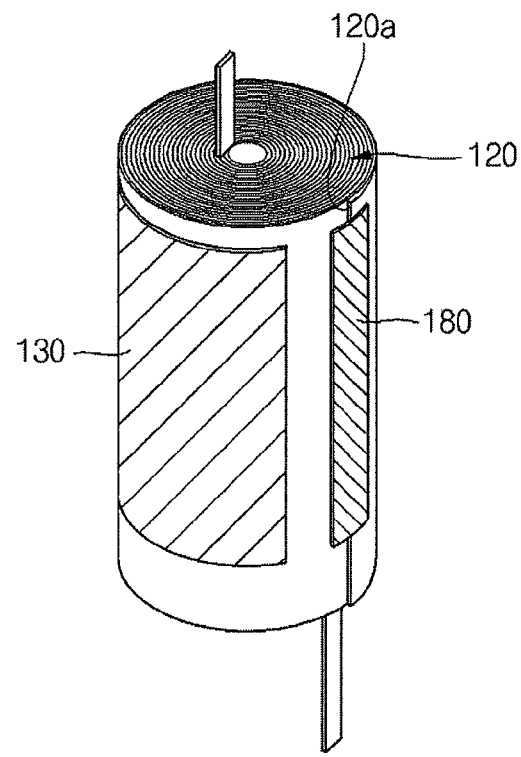
FIG. 8 is a perspective view of an electrode assembly having a tape according to still another embodiment.

FIG. 8 is a perspective view of an electrode assembly having a tape according to still another embodiment.

As shown in FIG. 8, the electrode assembly 120 having a tape 130 includes a finishing part 120a at which the outermost end of a separator is placed, the tape 130 is attached to at least a portion of the outer surface of the electrode assembly 120, and a sealing tape is attached to the outermost finishing part 120a.

The sealing tape 180 attached to the outermost finishing part 120a of the electrode assembly 120 prevents unwinding of the electrode assembly 120. That is to say, the sealing tape 180 is attached and wound around at least part of the outer circumference of the electrode assembly 120 including the outermost finishing part 120a, thereby preventing unwinding of the electrode assembly 120.

A sealing tape that is generally used in the related art may be used as the sealing tape 180. Examples of the sealing tape 180 may include, but not limited to, a film having a bottom surface coated with an adhesive material such as polyethylene terephthalate (PET), polypropylene (PP), polyethylene (PE), and polyimide (PI). Examples of the adhesive material may include, but not limited to, an acryl-based adhesive material. Examples of the acryl-based adhesive material may include at least one of the following: poly methyl methacrylate (PMMA), poly ethyl methacrylate (PEMA), and poly butyl methacrylate (PBMA).

The adhesive material contacts the outermost finishing part 120a of the electrode assembly 120. A width and a circumferential length of the sealing tape 180 may be appropriately adjusted in the minimum range allowing for unwinding of the electrode assembly 120 in such a manner that the sealing tape 180 includes the outermost finishing part 120a. Here, the tape 130 may be attached to the electrode assembly 120 either covering or not covering the sealing tape 180, which is optionally and easily performed in the manufacture of the secondary battery 100.

Since the electrode assembly 120 and the tape 130 have the same structures as those of the embodiment illustrated in FIGS. 1 to 6, except that the sealing tape 180 is attached to the electrode assembly 120 in such a manner that it includes the outermost finishing part 120a of the electrode assembly 120, detailed descriptions thereof will be omitted.

Figure 9:
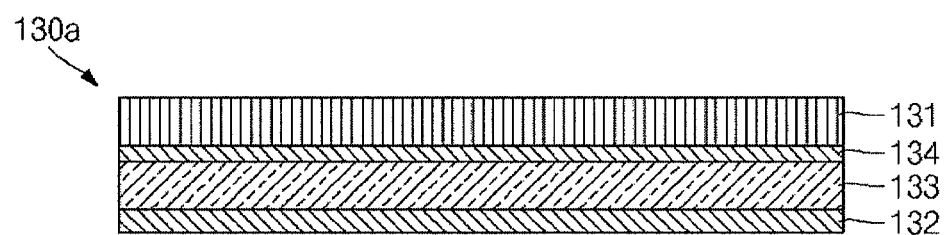
FIG. 9 is a cross section of a tape used in a secondary battery according to still another embodiment.
Figure 10:
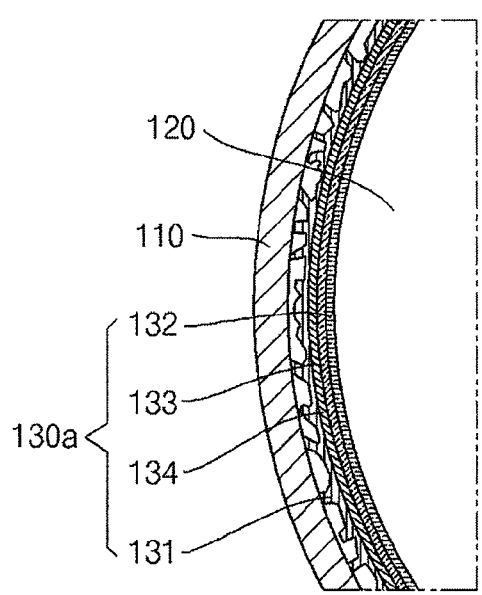
FIG. 10 schematically illustrates a longitudinal sectional view of the secondary battery having the tape shown in FIG. 9 after injecting an electrolyte into the secondary battery.

FIG. 9 is a cross section of a tape used in a secondary battery according to still another embodiment, and FIG. 10 schematically illustrates a longitudinal sectional view of the secondary battery having the tape shown in FIG. 9 after injecting an electrolyte into the secondary battery.

As shown in FIGS. 9 and 10, the secondary battery includes a tape 130a attached to the outer surface of an electrode assembly 120 accommodated inside a case 110. Since structures of components other than the tape 130a are same as those of the embodiment illustrated in FIGS. 1 to 6, only the tape 130a will now be described in detail.

The tape 130a includes an adhesive layer 132 contacting an external surface of the electrode assembly 120, an auxiliary base layer 133 formed on the adhesive layer 132, an auxiliary adhesive layer 134 formed on the auxiliary base layer 133, and a base layer 131 disposed on the auxiliary base layer 133 and having at least a portion exhibiting an adhesive property when contacting electrolyte.

The tape 130a is disposed between the outer surface of the electrode assembly 120 and the inner surface of a case 110. The tape 130a having the above-described structure may be attached in such a manner that it includes an outermost finishing part of the electrode assembly 120.

Since the base layer 131 and the adhesive layer 132 have the same structures as those of the embodiment illustrated in FIGS. 1 to 6, detailed descriptions thereof will be omitted.

In a case where the tape 130a is attached in such a manner that it includes the outermost finishing part 120a of the electrode assembly 120, the auxiliary base layer 133 disposed on the adhesive layer 132 is provided to prevent unwinding of the electrode assembly 120 by deformation due to a contact between the base layer 131 and the electrolyte.

The auxiliary base layer 133 may be formed of a film made at least partially of polyethylene terephthalate (PET), polypropylene (PP), polyethylene (PE), or polyimide (PI), but not limited thereto.

In addition, the auxiliary base layer 133 may be formed to a thickness in the range of about 10 µm to about 20 µm. However, the thickness of the auxiliary base layer 133 may vary.

The auxiliary adhesive layer 134 connects the base layer 131 and the auxiliary base layer 133 to each other. Like the adhesive layer 132, the auxiliary adhesive layer 134 may include an acryl-based adhesive material, and examples of the acryl-based adhesive material may include poly methyl methacrylate (PMMA), poly ethyl methacrylate (PEMA), and poly butyl methacrylate.

Like the adhesive layer 132, the auxiliary adhesive layer 134 may be coated on the auxiliary base layer 133 by various coating methods known in the related art and the thickness of the auxiliary adhesive layer 134 may be varied. For example, the auxiliary adhesive layer 134 may be coated on the auxiliary base layer 133 to a thickness in the range of about 1 µm to about 30 µm by knife coating. However, other coating methods and different thicknesses of adhesive material may also be used.

Figure 11:
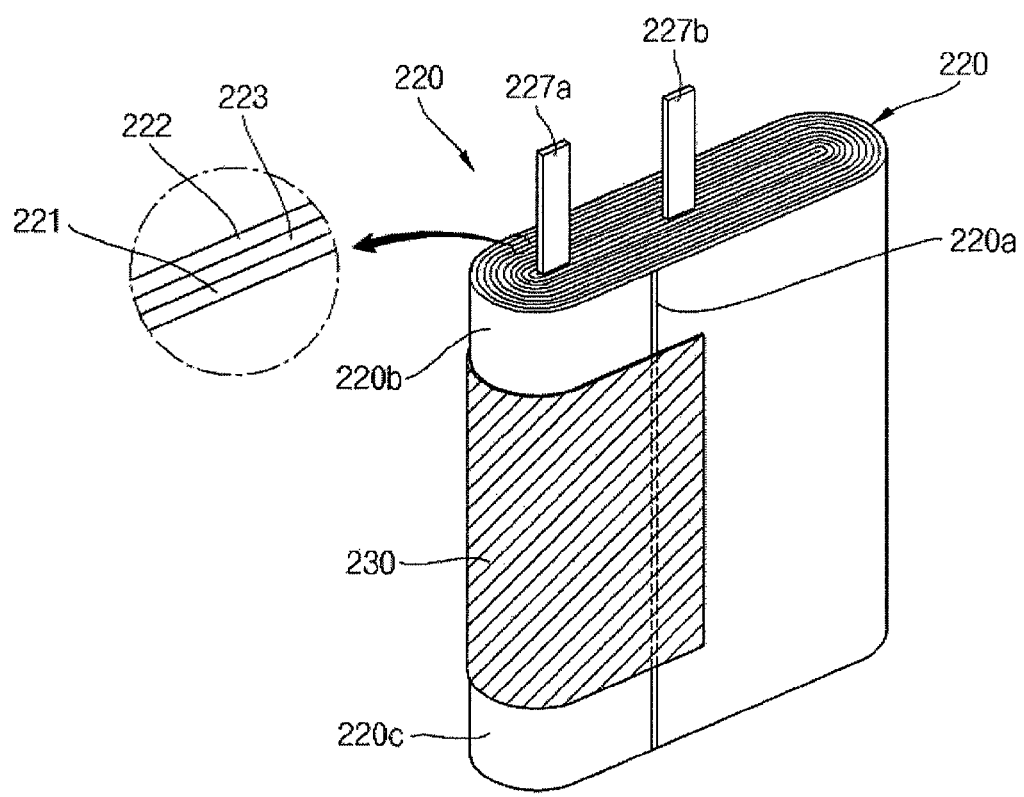
FIG. 11 is a perspective view of an electrode assembly having a tape according to still another embodiment.
Figure 12:
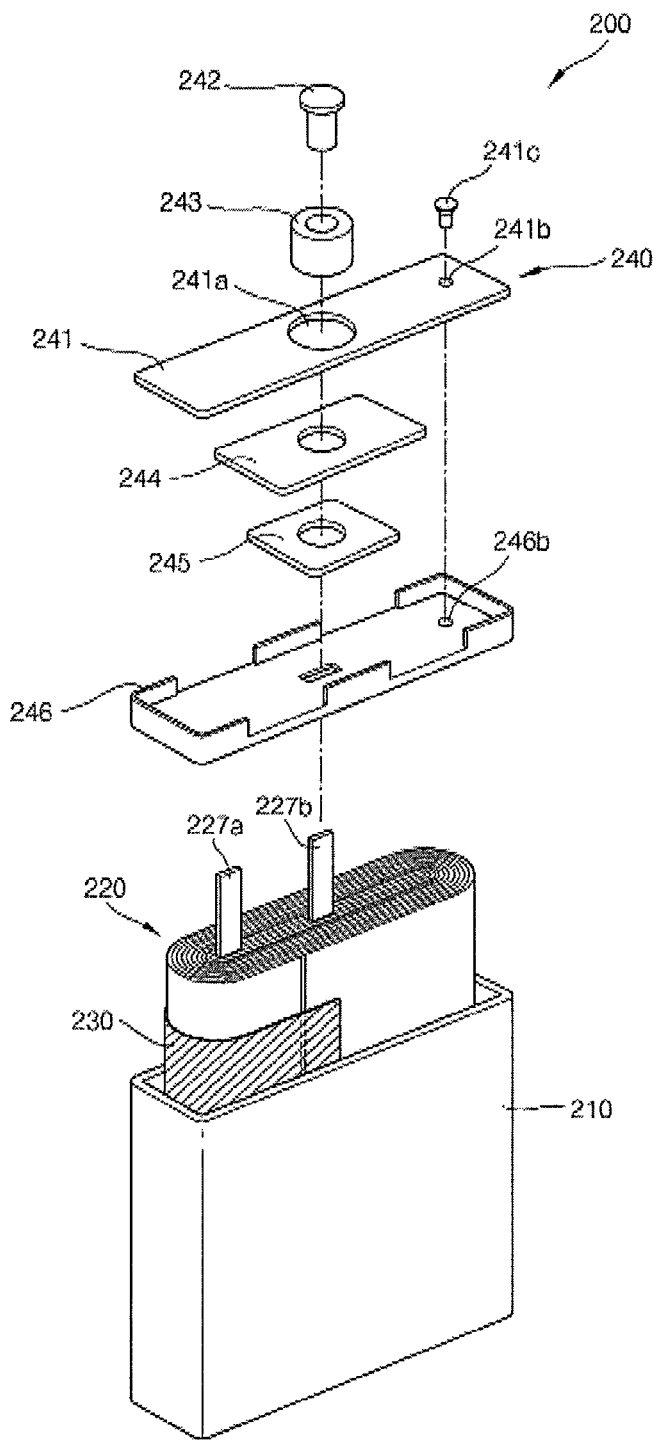
FIG. 12 is an exploded perspective view of a prismatic secondary battery including the electrode assembly having a tape shown in FIG. 11.

FIG. 11 is a perspective view of an electrode assembly having a tape according to still another embodiment, and FIG. 12 is an exploded perspective view of a prismatic secondary battery including the electrode assembly having the tape shown in FIG. 11.

Referring to FIGS. 11 and 12, the prismatic secondary battery 200 includes a case 110 having a substantially prismatic shape, an electrode assembly 220 accommodated inside the case 210, a tape 230 attached to at least one portion of an outer surface of the electrode assembly 220, and a cap assembly 170 coupled to an upper part of the case 210.

The case 210 is formed of a generally rectangular metal can, and may function as a terminal.

The electrode assembly 220 includes a first electrode plate 221, a second electrode plate 222, and a separator 223. The electrode assembly 220 is formed by sequentially stacking the first electrode plate 221, the second electrode plate 222, and the separator 223 disposed between the first and second electrode plates 221 and 222 and winding the stacked components in a substantially rectangular shape.

The electrode assembly 220 further includes a first electrode tab 227a and a second electrode tab 227b. An insulation tape (not shown) may be formed at an interface between the first electrode tab 227a and the second electrode tab 227b drawn from the electrode assembly 220 to prevent an electrical short between the first electrode plate 121 and the second electrode plate 122. In FIG. 11, reference numerals 220b and 220c refer to an upper end part and a lower end part of the outer surface of the electrode assembly 220, respectively.

Since structures of the electrode assembly 220 are substantially the same as those for the cylindrical secondary battery 100 according to the embodiment illustrated in FIGS. 1 through 6, except for the electrode assembly 220 formed in the generally rectangular shape and the direction in which the electrode tabs are drawn, detailed descriptions thereof will be omitted.

The tape 230 is attached to at least a portion of an external surface of the electrode assembly 220. For example, the tape 230 is disposed between the electrode assembly 220 and the case 210. Since various layers and positions of the tape 230 attached are the same as those of the cylindrical secondary battery 100, detailed descriptions thereof will be omitted.

As described above, the tape 230 includes a base layer having at least a portion exhibiting an adhesive property due to a contact with an electrolyte. When the portion of the base layer exhibits the adhesive property due to a contact with the electrolyte, the adhesive portion of the base layer contacts an inner surface of the case 210, thereby preventing the electrode assembly 220 from moving inside the case 210.

The cap assembly 240 includes a cap plate 241 having a size and structure corresponding to those of an opening of the case 210. A terminal throughhole 241a is formed at the center of the cap plate 241, and an electrolyte injection hole 241b for injection of electrolyte is formed at one side of the cap plate 241. The electrolyte injection hole 241b is engaged with a plug 241c to be hermetically sealed.

An electrode terminal 242, for example, a negative electrode terminal, may be inserted into the terminal throughhole 241a. A gasket 243 is provided at an external surface of the electrode terminal 242 for electrical insulation from the cap plate 241. An insulation plate 244 is disposed below the cap plate 241. A terminal plate 245 is disposed below the insulation plate 244.

The electrode terminal 242 is inserted through the terminal throughhole 241a while the gasket 243 wraps around the outer circumference of the electrode terminal 242. A bottom portion of the electrode terminal 242 is electrically connected to the terminal plate 245 in a state in which the insulation plate 244 is disposed between the electrode terminal 242 and the terminal plate 245.

In one embodiment, the first electrode tab 227a drawn from the first electrode plate is welded to the bottom surface of the cap plate 241, and the second electrode tab 227b drawn from the second electrode plate is welded to the bottom surface of the electrode terminal 242.

In one embodiment, an insulation case 246 is installed on the electrode assembly 220 to electrically insulate the electrode assembly 220 from the cap assembly 240 while covering an upper portion of the electrode assembly 220. The insulation case 246 includes an electrolyte injection throughhole 246b at a location corresponding to the electrolyte injection hole 241b of the cap plate 241 for injection of electrolyte. The insulation case 246 may be formed of an insulating polymer resin, for example, polypropylene (PE).

Although not shown, the prismatic secondary battery 200 may also include a protective circuit module and an upper cover. The protective circuit module may control charging/discharging and malfunction of the electrode assembly 220. For example, when over-current is applied from the electrode assembly 220, the protective circuit module blocks the over-current. The protective circuit module generally includes a variety of protection circuits. In addition, the upper cover may be configured to cover the protective circuit module. The protective circuit module and the upper cover may be easily implemented by one skilled in the art.

In the prismatic secondary battery 200, when the base layer of the tape 230 contacts the electrolyte, the surface of the base layer becomes uneven and at least a portion of the base layer exhibits an adhesive property. Here, the adhesive portion of the base layer comes into contact with an inner surface of the case 210, thereby preventing the electrode assembly 220 from moving inside the case 210. Since the electrode assembly 220 and the case 210 are securely fixed to each other by an adhesive force, it is possible to prevent the electrode assembly 220 from moving inside the case 210.

Figure 13:
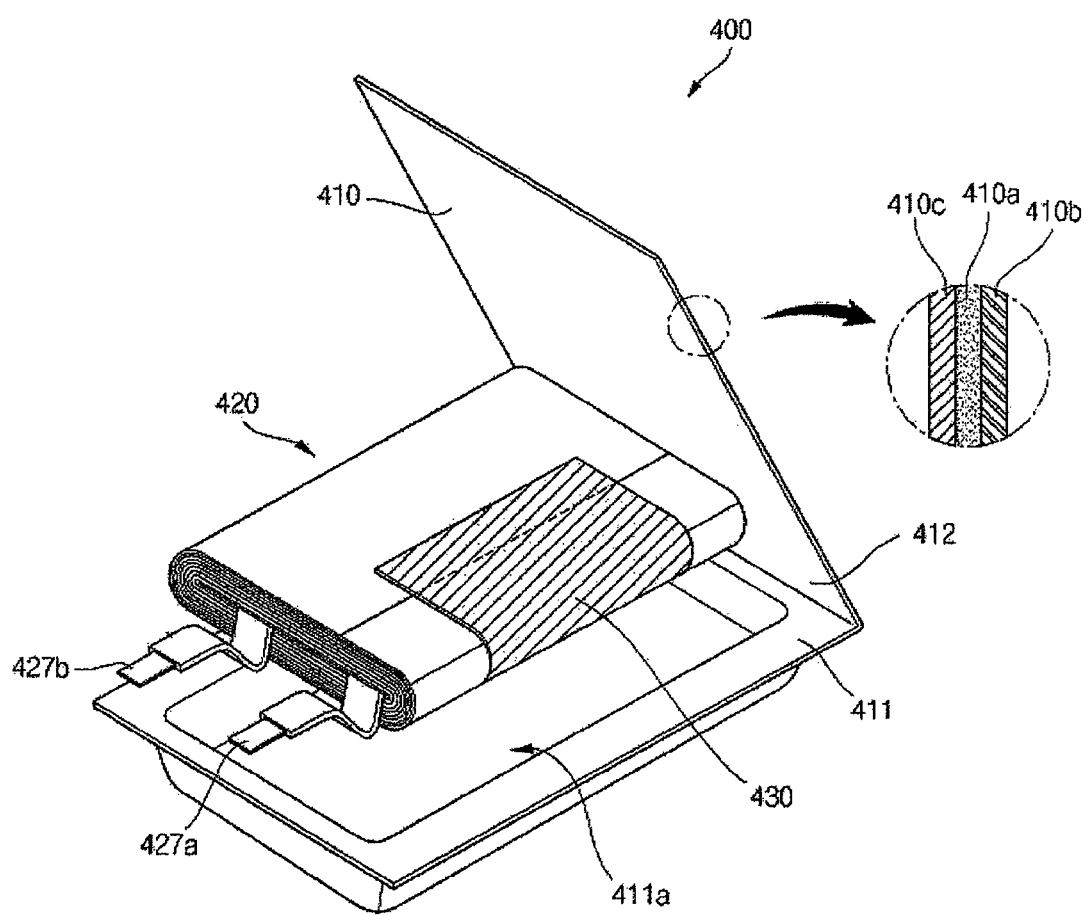
FIG. 13 is an exploded perspective view of a pouch-type secondary battery including the electrode assembly having a tape according to still another embodiment.

FIG. 13 is an exploded perspective view of a pouch-type secondary battery including the electrode assembly having a tape according to still another embodiment.

Referring to FIG. 13, the pouch-type secondary battery 400 includes a pouch-type case 410, an electrode assembly 420 accommodated in the case 410, and a tape 430 attached to at least a portion of an outer surface of the electrode assembly 420.

The case 410 may include a core 410*a* formed at least partially of a metal such as aluminum (Al), a thermal fusion layer 410*b* formed on the core 410*a*, and an insulation layer 410*c* formed under the core 410*a*. The thermal fusion layer 410*b* may be used as an adhesive layer using a polymer resin such as modified polypropylene, for example, casted polypropylene (CPP), and the insulation layer 410*c* may be formed at least partially of a resin such as nylon or polyethylene terephthalate (PET). However, other structures and materials for the pouch-type case 410 may also be used. In addition, the case 410 includes a bottom surface 411 having a space 411*a* in which the electrode assembly 420 is received, and a top surface 412 for covering the bottom surface 411 having the space 411*a*. The space 411*a* for receiving the electrode assembly 420 may be formed by, for example, pressing.

After the electrode assembly 420 is received in the space 411*a* of the bottom surface 411, the case 410 is covered by the top surface 412 and sealed by welding.

Since the electrode assembly 420 and the tape 430 are substantially the same as described above in the prismatic secondary battery 200, detailed descriptions thereof will be omitted.

The electrode assembly 420 having the tape 430 attached thereto is received in the case 410. The electrode assembly 420 includes a first electrode tab 427*a* and a second electrode tab 427*b*. After the electrode assembly 420 is received in the case 410, each of the first electrode tab 427*a* and the second electrode tab 427*b* is drawn outwardly in a predetermined direction and in a predetermined length.

Although not shown, the pouch-type secondary battery 400 may further include a protective circuit module. The protective circuit module controls charging/discharging and malfunction of the electrode assembly 420. For example, when over-current is applied from the electrode assembly 420, the protective circuit module blocks the over-current. The protective circuit module generally includes a variety of protection circuits. Here, the protective circuit module is electrically connected to the first electrode tab 427*a* and the second electrode tab 427*b* of the electrode assembly 420.

In the pouch-type secondary battery 400, when a base layer of the tape 430 contacts electrolyte, the surface of the base layer becomes uneven and at least a portion of the base layer exhibits an adhesive property. Here, the adhesive portion of the base layer comes into contact with an inner surface of the case 410, thereby preventing the electrode assembly 420 from moving inside the case 410. Since the electrode assembly 420 and the case 410 are securely fixed to each other by an adhesive force, it is possible to prevent the electrode assembly 420 from moving inside the case 410.

Another embodiment is a method for forming a secondary battery.

In one embodiment, the method includes inserting an electrode assembly, and injecting electrolyte. In the inserting of the electrode assembly, a tape including a base layer having at least a portion exhibiting an adhesive property due to a contact with electrolyte is attached to at least a portion of an outer surface of the electrode assembly, and the electrode assembly having the tape attached thereto is inserted. In the injecting of the electrolyte, allowing the adhesive portion to contact an inner surface of the case by bringing the base layer contact with the electrolyte to make the portion of the base layer exhibit the adhesive property.

Hereinafter, an exemplary method for forming a secondary battery will be described with reference to FIGS. 1 to 6. In the following, the method will be described with regard to a cylindrical secondary battery. However, it will be readily appreciated by one skilled in the art that the method may also be applied to a prismatic secondary battery or a pouch-type secondary battery.

The method includes injecting an electrode assembly 120 and injecting electrolyte.

In the inserting of the electrode assembly 120, the tape 130 including the base layer 131 having at least a portion exhibiting an adhesive property due to a contact with electrolyte is attached to at least a portion of an outer surface of the electrode assembly 120, and the electrode assembly 120 having the tape 130 attached thereto is inserted into the case 110.

Since the tape 130 including the base layer 131 is the same as described above in the embodiment of the cylindrical secondary battery 100, a detailed description thereof will be omitted.

The tape 130 is positioned between an outer surface of the electrode assembly 120 and an inner surface of the case 110.

Before and after inserting the electrode assembly 120 having the tape 130 attached thereto into the case 110, some of the other components of the secondary battery 100 may be assembled.

For example, in a state in which a lower insulation member 150, the tape 130 attached thereto into the case 110 and an upper insulation member 140 are sequentially arranged from a lower side in that order, a second electrode tab 127*b* of the electrode assembly 120 is coupled to a bottom plate 112 of the case 110 by, for example, welding. At this time, a beading part 111 and a crimping part 116 are not yet formed at the case 110.

Next, the beading part 111 is formed at the sidewall 113 of the case 110 to prevent the lower insulation member 150, the electrode assembly 120 having the tape 130 attached thereto, and the upper insulation member 140 from moving inside the case 110 in a direction perpendicular to the bottom plate 112.

As described above, the electrode assembly 120 having the tape 130 attached thereto is accommodated in the case 110, and other components of a secondary battery 100 are assembled, followed by injecting electrolyte.

In the injecting of the electrolyte, the base layer 131 is allowed to contact the electrolyte to at least partially exhibit an adhesive property, so that the adhesive portion may contact the inner surface of the case 110.

The electrolyte allows lithium ions generated by an electrochemical reaction in the electrodes when they were charged and discharged to be mobile.

If the electrolyte is injected into the case 110, the base layer 131 of the tape 130 attached to the outer surface of the electrode assembly 120 comes into contact with the electrolyte. Here, the base layer 131 has an adhesive force due to a contact with the electrolyte. At least a portion of the base layer 131 having an adhesive force comes into contact with the inner surface of the case 110, thereby preventing the electrode assembly 120 from moving inside the case 110.

An assembling process of the other components of the secondary battery 100 may be performed after the injecting of the electrolyte. For example, the insulating gasket 160 is inserted through the opening 114 and placed on the beading part 111. Thereafter, the cap assembly 170 is placed inside the insulating gasket 160. Then, the crimping part 116 is formed on the upper end of the sidewall 113 so as to fix the insulating gasket 160 and the cap assembly 170.

After the secondary battery 100 is assembled in this way, a post-treatment process such as a formation process and an aging process may be performed. The formation process and an aging process may be commonly applied to a prismatic secondary battery and a pouch-type secondary battery.

In the formation process, the assembled secondary battery may be repeatedly charged and discharged so as to activate the secondary battery. When the secondary battery is charged, lithium ions moves from a lithium metal oxide used as a positive electrode to a carbon electrode used as a negative electrode. At this time, since lithium is highly reactive, the lithium ions react with the negative carbon electrode to produce reaction products such as $Li_2CO_3$, LiO, LiOH or the like, which form a film called solid electrolyte interface (SEI) on the surface of the carbon electrode.

In the aging process, a secondary battery may be allowed to sit for a predetermined time so as to stabilize the SEI film. In one embodiment, in the aging process, the secondary battery may be allowed to sit for about 18 hours to about 36 hours at about 50° C. to about 70° C. Through the aging process, the base layer of the tape 130 has a sufficient adhesive force, and the movement of the electrode assembly 120 can be efficiently prevented accordingly.

Hereinafter, certain examples according to non-limiting exemplary embodiments will be described.

EXAMPLES 1-3

$LiCoO_2$ used as a positive electrode active material, polyvinylidene fluoride (PVDF) used as a binder, and carbon used as a conductive material were mixed at a weight ratio of 92:4:4, and the mixture was dispersed in N-methyl-2-pyrrolidone so as to form a positive electrode slurry. The positive electrode slurry was coated with an aluminum foil having a thickness of about 20 µm and was dried and rolled to form a positive electrode.

Artificial graphite used as a negative electrode active material, styrene-butadiene rubber used as a binder, and carboxymethylcellulose used as a thickener were mixed at a weight ratio of 96:2:2, and the mixture was dispersed in water so as to form a negative electrode slurry. A copper foil having a thickness of about 15 µm was coated with the negative electrode slurry and was dried and rolled to form a negative electrode.

A polyethylene/polypropylene porous film (Hoest Cellanese, U.S.) having a thickness of 20 µm was used as a separator. The separator was placed between the cathode and the anode. Then, the separator, the cathode, and the anode were wound, and a tape was wound around them in such a manner that the tape includes a winding end, thereby manufacturing an electrode assembly.

A 32 µm thick oriented polystyrene (OPS) film coated with a 15 µm thick poly methyl methacrylate (PMMA) adhesive was used as the tape. An electrode assembly having a longer diameter of 17.00 mm and a shorter diameter of 16.56 mm was used. Assuming that a length of the entire outer circumference of the electrode assembly is 52 mm, 52 mm of the tape was attached to the outer surface of the electrode assembly. Here, the tape was entirely attached to the outer circumference of the electrode assembly, including upper and lower end parts of the electrode assembly.

The electrode assembly wound by a jelly-roll method was inserted in a cylindrical aluminum battery case, and electrolyte was injected into the case, followed by sealing the case, thereby completing the secondary battery.

Here, a mixture organic solvent of ethylene carbonate (EC), dimethyl carbonate (DMC), propylene carbonate (PC), and fluororobenzene (FB) (volumetric ratio of EC:DMC:PC:FB was 30:55:5:10), in which 1.1 M of $LiPF_6$ was dissolved, was used as the non-aqueous electrolyte.

EXAMPLES 2-4

Secondary batteries were manufactured in the same manner as in Example 1 except that lengths of the tape attached were changed as listed in Table 1.

COMPARISON EXAMPLE 1

A secondary battery was manufactured in the same manner as in Example 1 except that a sealing tape having a PMMA adhesive coated on a PET film was used instead of the tape.

EXPERIMENTAL EXAMPLE 1

Measurement of Movement

Movement of each of secondary batteries manufactured in Examples and Comparison Examples was measured using a drum test method, and the results were shown in Table 1 and Table 2.

In the drum test method, the secondary battery was disposed within a drum, and while vibration (66 RPM) was applied, and the change in the internal resistance (IR) of the secondary battery per unit time was measured. The more time it takes to obtain a determination of defectiveness from the drum test indicates that the internal movement of the secondary battery was reduced. The movement preventing effect can be confirmed through the drum test results.

In one embodiment, it is desirable that the increase of the IR does not exceed about 110% of the initial IR.

Here, each six secondary battery samples were prepared to be used for measurement in the respective Examples.

TABLE 1

|  |  | Initial | 130 min | | 160 min | |
|---|---|---|---|---|---|---|
|  |  | time IR | IR | Increase (%) | IR | Increase (%) |
| Example 1 (52 mm attached) | 1 | 12.8 | 15.4 | 120 | 16.3 | 127 |
|  | 2 | 13.0 | 15.3 | 118 | 15.9 | 122 |
|  | 3 | 13.2 | 15.4 | 117 | 15.8 | 120 |
|  | 4 | 13.3 | 15.4 | 116 | 15.6 | 117 |
|  | 5 | 13.5 | 15.5 | 115 | 15.8 | 117 |
|  | 6 | 13.2 | 15.4 | 117 | 15.6 | 118 |
| Example 2 (26 mm attached) | 1 | 13.2 | 15.7 | 119 | Cut | — |
|  | 2 | 13.2 | 16.1 | 122 | Cut | — |
|  | 3 | 13.3 | 16.0 | 120 | Cut | — |
|  | 4 | 13.2 | Cut | — | Cut | — |
|  | 5 | 13.7 | 16.0 | 117 | Cut | — |
|  | 6 | 13.4 | 15.7 | 117 | Cut | — |
| Example 3 (36 mm attached) | 1 | 14.8 | 14.4 | 97 | 15.0 | 101 |
|  | 2 | 14.7 | 14.5 | 99 | 15.1 | 103 |
|  | 3 | 14.7 | 14.2 | 97 | 14.8 | 101 |
|  | 4 | 14.5 | 14.1 | 97 | 14.6 | 101 |
|  | 5 | 14.9 | 14.5 | 97 | 14.8 | 99 |
|  | 6 | 14.7 | 14.3 | 97 | 14.8 | 101 |

TABLE 1-continued

|  |  | Initial time IR | 130 min IR | Increase (%) | 160 min IR | Increase (%) |
|---|---|---|---|---|---|---|
| Example 4 (46 mm attached) | 1 | 14.1 | 14.6 | 104 | 14.5 | 103 |
|  | 2 | 14.3 | 14.3 | 100 | 14.3 | 100 |
|  | 3 | 14.4 | 14.7 | 102 | 14.4 | 100 |
|  | 4 | 14.2 | 14.4 | 101 | 14.2 | 100 |
|  | 5 | 14.2 | 14.4 | 101 | 14.1 | 99 |
|  | 6 | 14.5 | 14.4 | 99 | 14.2 | 98 |

TABLE 2

|  |  | Initial time IR | 60 min IR | Increase (%) | 80 min IR | Increase (%) |
|---|---|---|---|---|---|---|
| Comparative Example 1 | 1 | 16.2 | 17.3 | 107% | Cut | — |
|  | 2 | 16.2 | 16.8 | 104% | Cut | — |
|  | 3 | 16.0 | 16.8 | 105% | Cut | — |
|  | 4 | 15.6 | 16.5 | 106% | Cut | — |
|  | 5 | 15.8 | 16.1 | 102% | Cut | — |
|  | 6 | 15.6 | 16.2 | 104% | Cut | — |

As can be clearly seen from the drum test results given in Table 1 and Table 2, in Comparison Example 1 in which a general sealing tape was used, no internal resistance (IR) of the secondary battery sample was measured at about 80 min (IR indicated as "cut"). However, in Examples 1 to 4 in which the tapes according to the present embodiment were used, the internal resistance (IR) was measured in all of the secondary battery samples before 130 min, suggesting that the movement preventing effect was significantly improved.

In addition, in Example 2 in which the tape is attached to half of the entire outer circumference of the electrode assembly, internal resistance (IR) of one secondary battery sample was not measured at about 130 min. Thus, assuming that a length of the entire outer circumference of the electrode assembly is 1, the tape may be attached to the outer surface of the electrode assembly by 0.5 or more, that is, more than half of the entire outer circumference of the electrode assembly. Further, when the dimension of the tape attached to the outer circumference of the electrode assembly is the same as that of the outer circumference of the electrode assembly, like in Example 1, the movement preventing effect of the secondary battery was reduced, compared to the cases in Examples 3 and 4, as confirmed by the drum test results. That is to say, when the tape is attached to the outer circumference of the electrode assembly by more than 0.5 and less than 1 assuming that a length of the entire outer circumference of the electrode assembly is 1, the tape exhibits excellent the movement preventing effect while efficiently saving the tape.

EXPERIMENTAL EXAMPLE 2

Measurement of Adhesive Force

Secondary batteries manufactured in Examples 1-4 were not subjected to drum tests and an adhesive force of an electrode assembly for each of the secondary batteries was measured.

The measurement results (the average of 6 secondary battery samples in each Example) are shown in Table 3.

The adhesive force of the electrode assembly was measured as follows. Upper and lower ends of each of the secondary batteries were cut, and a push-pull gauge is disposed on the lower end of the secondary battery, and then, the push-pull gauge is pushed upwardly to move the electrode assembly.

TABLE 3

|  | Adhesive Force (kgf/cm$^2$) |
|---|---|
| Example 1 | 2.3 |
| Example 2 | 1.0 |
| Example 3 | 1.2 |
| Example 4 | 1.5 |
| Comparative Example 1 | — |

As confirmed from Table 3, in the secondary batteries manufactured in Examples 1-4 in which the inventive tapes are used, the electrode assembly exhibited a higher adhesive force than the electrode assembly of the secondary battery in Comparative Example 1.

According to at least one embodiment, when a base layer of a tape attached to an outer surface of the electrode assembly comes into contact with an electrolyte, a surface of the base layer is changed into an uneven surface to make the base layer partially exhibit an adhesive property. At least a portion of the base layer exhibiting the adhesive property contacts an inner surface of the case, thereby preventing the electrode assembly from moving inside the case. Since the electrode assembly and the case are firmly fixed to each other by adhesiveness, it is possible to prevent the electrode assembly from moving inside the case.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
   an electrode assembly;
   an electrolyte;
   a tape attached to at least part of an outer surface of the electrode assembly; and
   a case accommodating the electrode assembly, electrolyte and tape,
   wherein the tape comprises a base layer, and wherein at least a portion of the base layer is configured to shrink and exhibit an adhesive property when contacting the electrolyte so as to contact an inner surface of the case.

2. The secondary battery of claim 1, wherein the tape further comprises an adhesive layer formed on a rear surface of the base layer and contacting the outer surface of the electrode assembly.

3. The secondary battery of claim 2, wherein the tape further comprises an auxiliary base layer and an auxiliary adhesive layer interposed between the base layer and adhesive layer, wherein the auxiliary base layer contacts the adhesive layer and auxiliary adhesive layer, and wherein the auxiliary adhesive layer contacts the base layer and auxiliary base layer.

4. The secondary battery of claim 1, wherein the base layer is formed at least partially of an oriented polystyrene (OPS) film.

5. The secondary battery of claim 1, wherein the electrode assembly comprises a first electrode, a separator and a second electrode which are sequentially stacked and wound, wherein the separator is disposed between the first and second electrodes, and wherein an outermost finishing part is formed on a winding end of the separator.

6. The secondary battery of claim 5, wherein the tape comprises the outermost finishing part.

7. The secondary battery of claim 5, wherein the electrode assembly comprises the outermost finishing part, and wherein the tape is attached to the outermost finishing part of the electrode assembly.

8. The secondary battery of claim 1, wherein the electrolyte comprises a carbonate based solvent, and wherein the carbonate based solvent of the electrolyte comprises at least one of the following: dimethyl carbonate (DMC) electrolyte, diethyl carbonate (DEC) and dipropyl carbonate (DPC).

9. The secondary battery of claim 8, wherein the electrolyte comprises about 10% to about 60% by weight of the carbonate based solvent.

10. The secondary battery of claim 1, wherein the base layer has a thickness in the range of about 10 μm and about 50 μm.

11. The secondary battery of claim 1, wherein the tape is attached to substantially the entire outer circumference of the electrode assembly.

12. The secondary battery of claim 1, wherein when the dimension of the entire outer circumference of the electrode assembly is defined as 1, the dimension of the tape attached to the outer circumference of the electrode assembly is defined as 0.5 or more.

13. The secondary battery of claim 1, wherein when the dimension of the entire outer circumference of the electrode assembly is defined as 1, the dimension of the tape attached to the outer circumference of the electrode assembly is defined as more than 0.5 and less than 1.

14. The secondary battery of claim 1, wherein the tape is attached to parts other than an upper end part and a lower end part of the outer surface of the electrode assembly.

15. The secondary battery of claim 14, wherein a width of the tape is at least about 20% of a width of the electrode assembly.

16. The secondary battery of claim 1, wherein the tape has an adhesion force of at least about 1 kgf/cm$^2$.

17. The secondary battery of claim 1, wherein the case is of a cylindrical type, a prismatic type, or a pouch type.

18. A secondary battery comprising:
an electrode assembly;
an electrolyte;
a tape attached to at least part of an outer surface of the electrode assembly; and
a case accommodating the electrode assembly, electrolyte and tape,
wherein the tape comprises i) an adhesive layer contacting the outer surface of the electrode assembly and ii) a base layer having at least a portion exhibiting an adhesive property and configured to shrink when contacting the electrolyte, and wherein the base layer has an uneven surface.

19. The secondary battery of claim 18, wherein the base layer comprises a first region and a second region, wherein the first region is thicker than the second region, and wherein the first region contacts an inner surface of the case.

20. A secondary battery comprising:
an electrode assembly;
an electrolyte;
a case accommodating the electrode assembly,
an adhesive layer attached to at least part of an outer surface of the electrode assembly; and
a base layer having first and second surfaces opposing each other, wherein the first surface contacts the adhesive layer, and wherein at least a portion of the second surface of the base layer is configured to shrink and exhibit an adhesive property when contacting the electrolyte so as to contact an inner surface of the case.

* * * * *